United States Patent [19]
Erspamer

[11] 3,938,257
[45] Feb. 17, 1976

[54] TWO-CYCLE COMPENSATOR FOR FLUX VALVE HEADING REPEATER SYSTEM

[75] Inventor: James R. Erspamer, Phoenix, Ark.
[73] Assignee: Sperry Rand Corporation, New York, N.Y.
[22] Filed: Dec. 2, 1974
[21] Appl. No.: 528,758

[52] U.S. Cl. ................................................. 33/361
[51] Int. Cl.² ........................................ G01C 17/28
[58] Field of Search ....................... 33/361; 318/691

[56] References Cited
UNITED STATES PATENTS

| | | | |
|---|---|---|---|
| 3,548,284 | 12/1970 | Espen | 318/691 |
| 3,678,593 | 7/1972 | Baker et al. | 33/361 |
| 3,705,980 | 12/1972 | Brickner et al. | 33/361 X |

Primary Examiner—William D. Martin, Jr.
Attorney, Agent, or Firm—Howard P. Terry

[57] ABSTRACT

A flux valve compass heading repeater system is provided with a compensating system which, when connected to a three-legged flux valve, provides fully compensated, three-wire output signals of the synchro data transmitter type for direct use in apparatus requiring precision three-wire heading data. The compensating system includes control circuits for generating sine and cosine components of magnetic heading and for compensating them for typical compass errors such as those induced by changes in operating latitude and two cycle and index errors. Latitude compensation is accomplished by a novel proportional automatic gain control; two cycle cardinal heading error compensation is accomplished by a compensation circuit having only a single manual control, while index error compensation is similarly accomplished by a compensation circuit requiring only a single manual control.

7 Claims, 6 Drawing Figures

TWO-CYCLE COMPENSATOR FOR FLUX VALVE HEADING REPEATER SYSTEM

CROSS REFERENCE TO RELATED APPLICATIONS

The present application is directly related to copending applications:

Ser. No. 528,760: "Latitude Compensation for Flux Valve Heading Repeater System", and Ser. No. 528,759: "Index Error Correction for Flux Valve Heading Repeater System". These applications were filed concurrently in the name of J. R. Erspamer and include substantially identical disclosures.

BACKGROUND OF THE INVENTION

1. Field of the Invention

The invention pertains to means for the compensation of undesirable errors or changes in the signal characteristics of flux valve data repeater systems and more particularly relates to apparatus for the correction of variations in the outputs of flux valve compass data repeater systems, including errors due to variation in the horizontal component of the earth's magnetic field, index angle errors, and cardinal and intercardinal heading errors.

2. Description of the Prior Art

When navigating at high latitudes with flux valve magnetic compass systems, difficulty is experienced because of the decreasing strength of the horizontal component of the earth's magnetic field, especially at high latitudes. A flux valve magnetic compass is normally arranged to sense only the horizontal component of the earth's field. As a consequence at high latitudes, the strength of the sensed component is proportionally lessened, and the compass system experiences decreasing sensitivity, resulting in heading information of diminished accuracy.

Prior art systems have sought to solve this compensation problem of providing an input of the magnetic compass data repeater substantially independent of variations in the strength of the horizontal component of the earth's field, as by controlling the gains of amplifiers or the effective values of impedances in the separate channels of the data transmitter system in a relatively complex manner, but generally in inverse relation to the signal strength as measured at the flux valve itself. Such prior art arrangements are described by D. A. Espen in the U.S. Pat. No. 3,548,284 for "Synchro Data Transmission Apparatus Having Discrete Gain Changing to Compensate for Undesirable Signal Gradient Variations", issued Dec. 15, 1970, and by J. R. Erspamer and G. W. Snyder in the U.S. Pat. No. 3,646,537 for an "Automatic Gain Control for an Electromechanical Transducer", issued Feb. 29, 1972, both patents being assigned to the Sperry Rand Corporation. While these concepts have been useful in providing adequate magnetic field compensation in most circumstances, the compensating signals actually compensate only for variation in the horizontal magnetic field component and generally do not additionally correct fully for gain changes caused by component variations or due to temperature or power supply voltage drifts or to component aging. Furthermore, the characteristics of the individual gain control elements of the individual channels of the data system may vary without proper corrective relative adjustments whereby two-cycle transmission errors are induced within automatic gain control stages.

The improved system disclosed by J. R. Erspamer and G. W. Snyder in the U.S. Pat. No. 3,784,753, issued Jan. 8, 1974 for a "Multiplexed Gain Control for a Synchro Data Transmission System" sought more fully to overcome these prior art defects by a relatively complex and expensive correction circuit. Though it generally overcame such defects, it was found that some undesirable two cycle error could be generated in its relatively complex automatic gain control stage, and that a simple way was needed for identically changing the gains of both of the sine and cosine channels of the data transmission system, but retaining the advantages of the concept of U.S. Pat. No. 3,784,753.

Prior art systems have additionally sought to provide correction for the cardinal heading error in compass data transmission systems by use of networks including precision differential synchros or ganged dual potentiometers which must track each other with high precision if they are not themselves to introduce errors. According to the present invention, the expense of obtaining such selected synchros or precision potentiometers is desirably eliminated. Index angle error was similarly corrected in prior compass data transmission systems by using precision synchros or ganged dual potentiometers of similar quality. It is found increasingly desirable to substitute simple and less expensive networks permitting single adjustment control for each of these correction purposes and, at the same time, retaining a high degree of precision.

SUMMARY OF THE INVENTION

The present invention provides means for correction of undesirable changes in the signal amplitudes in multiple channel flux valve data repeater systems partly by the employment of a simple common automatic gain control in a circuit configuration which not only compensates for earth's magnetic field strength changes, but also corrects for the effects of other error sources without introducing the errors of prior art systems. The novel control circuit of the present invention monitors the data repeater control signals near the inputs to the utilization device, rather than merely at the outputs of the flux valve. By monitoring the inputs at the utilization device, and by using the data repeater excitation voltage as a switching reference, the gain control, being part of a closed feed back loop, compensates not only for changes in the operating latitude but also for gain changes caused by variations of component parameters and by other effects without itself introducing new errors. According to a primary aspect of the present invention, electrically cross coupled network means provides correction in the sine and cosine channels of the flux valve data transmission system for two cycle cardinal error correction by the setting of only a single adjustment. A similar arrangement, again requiring only one adjustment, is employed for correction of any index angle error. In a modification of the compensation system, the two latter compensations are accomplished by direct current signals applied in predetermined ratios directly into the inductive windings of the flux valve.

DESCRIPTION OF THE PREFERRED EMBODIMENTS

Figure 1A:
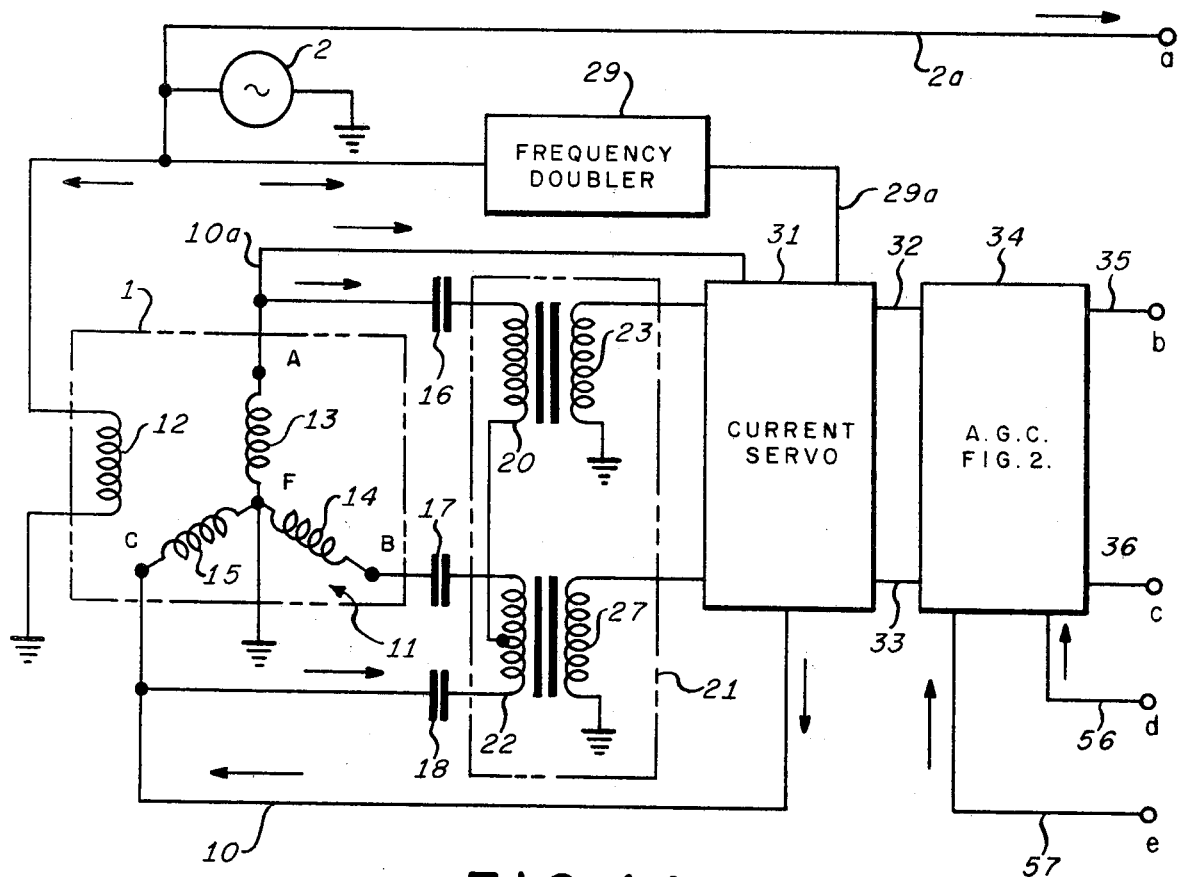
FIGS. 1A and 1B illustrate, partly in block diagram form, the principal elements of the invention and their electrical interconnections.
Figure 1B:
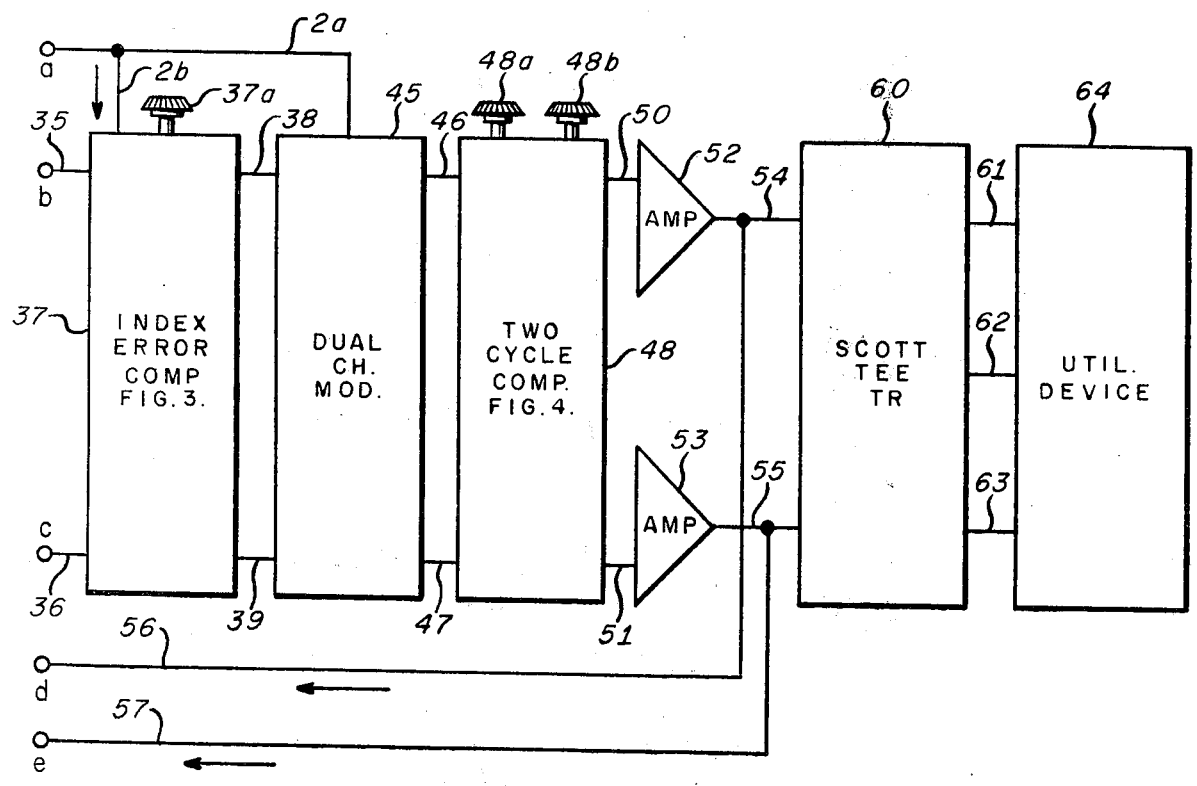

In FIGS. 1A and 1B, the novel compensated compass system includes a magnetic azimuth detector or flux valve 11 which may be of the general type disclosed in the M. C. Depp U.S. Pat. No. 2,852,859 for a "Flux Valve Compensating System", issued Sept. 23, 1958 and assigned to Sperry Rand Corporation. Other details of such flux valve devices are disclosed in the J. J. Kesselring U.S. Pat. No. 3,573,610, issued Apr. 6, 1971, in the D. J. Kesselring et al. U.S. Pat. No. 3,641,679, issued Feb. 15, 1974, and in the U.S. Pat. application Ser. No. 380,523 for "A Flux Valve Apparatus for Sensing Both Horizontal and Vertical Components of an Ambient Magnetic Field", filed July 18, 1973, issued as U.S. Pat. No. 3,873,914 Mar. 25, 1975, and assigned to Sperry Rand Corporation. Flux valve 11 is excited by alternating current source 2, which may be a conventional 400 Hz. oscillator or signal generator and which is coupled to excitation winding 12 of the flux valve 11.

As disclosed in the aforementioned Depp and Kesselring patents, flux valve 11 has three wye-connected inductive windings 13, 14, and 15 on a corresponding wye-shaped core, the winding legs meeting at a common grounded terminal F. The terminals of windings 13, 14, and 15 opposite terminal F are respectively labelled A, B, and C. Terminals A, B, and C may, if desired, be supplied with single cycle compensation signals from a single cycle compensator (not shown) of the general type shown in the aforementioned U.S. Pat. No. 2,852,859.

Terminal A of flux valve 11 is connected via a blocking capacitor 16 to one winding 20 of a Scott tee transformer 21, while terminals B and C are connected via respective blocking capacitors 17 and 18 to the respective ends of a second input winding 22 of Scott tee transformer 21. Winding 22 has a center tap connected to the other end of winding 20.

As is well known, the signal outputs of windings 13, 14, and 15 have a frequency double that applied to excitation winding 12. The frequency doubled cosine output of winding 23 of transformer 21 and its frequency doubled sine output in winding 27 are connected to current servo loop 31. Additionally supplied to current servo loop 31 via lead 29a is the output of frequency doubler 29. Since frequency doubler 29 is excited by generator 2, its output on lead 29a will have an 800 Hz. frequency and serves as a reference signal source for servo 31.

As described in detail in the D. H. Baker, F. H. Kallio U.S. Pat. No. 3,678,593 for a "Compass System and Components Therefor Having Automatic Field Cancellation", issued July 25, 1972 to Sperry Rand Corporation, current servo 31 supplies outputs on leads 32 and 33 which are direct current signals respectively proportional in amplitude to the sine and cosine of craft magnetic heading ($H_m \sin \psi$ and $H_m \cos \psi$). Accordingly, the horizontal components of the earth's magnetic field sensed by the flux value windings 13, 14, and 15 are resolved into sine and cosine component values that are then converted by current servo 31 into proportional direct currents on leads 32 and 33. As taught in the aforementioned Baker et al. patent, these direct current components are fed back via leads 10 and 10a into windings 13 and 15 of flux valve 11, which currents tend to cancel the earth's magnetic field therein. The feed back arrangement and its many advantages are discussed in detail in the aforementioned U.S. Pat. No. 3,678,593, including closed loop operation affording high accuracy outputs in the form of analog direct current outputs proportional to the sine and cosine of craft magnetic heading.

Accordingly, the 800 Hz., three-wire magnetic azimuth information derived by the horizontal magnetic field detector or flux valve 11 is converted to direct current signals proportional to the sine and cosine of craft heading by the cooperation of Scott tee transformer 21 and current servo 31. The magnitudes of the outputs on leads 32 and 33 are thus a function of craft magnetic azimuth or heading and the intensity of the horizontal component of the earth's magnetic field. The variation in the magnitude of the sine and cosine outputs caused by any change in magnetic field strength $H_m$ affects only the output gradient (volts per azimuth degree) and does not change the trigonometric relationship of the input magnetic heading angle $\psi$ and the output voltages of current servo 31, which may therefore be expressed as follows:

$$V_{32} = K_1 \sin \psi \qquad (1) \text{ and}$$
$$V_{33} = K_1 \cos \psi \qquad (2)$$

where $K_1$ allows for the gain of current servo 31 and has dimensions of volts per oersted.

The signals $V_{32}$ and $V_{33}$ on leads 32 and 33 serve as two inputs to the automatic gain control circuit 34, which circuit also receives certain fed back signals on leads 56 and 57. As will be further discussed, the fed back signals arise at the outputs of buffer amplifiers 52 and 53 after the outputs of automatic gain control 34 are processed at least by dual channel modulator 45. To understand the operation of the gain control circuit 34, the presence of the index error compensator 37 and the two-cycle compensator 48 may be ignored for the moment as a matter of convenience.

The final output of the compass system supplied by leads 61, 62, and 63 to an aircraft navigation system or other utilization device 64 is usually required to be useful in a three-wire synchro data transmitter system and to consist of proportional voltages between pairs of such leads, as between leads 61 and 62, 62 and 63, 63 and 61. These may nominally be 11.8 volts, for example, and must be maintained at a constant gradient in the interest of meeting required compass accuracy over a wide range of horizontal magnetic field strengths $H_m$. Because the output of flux valve 11, and therefore the output of current servo 31, has a gradient which is directly proportional in magnitude to the horizontal magnetic field strength which, of course, varies with latitude, the automatic gain control stage 34 is required to hold the system output signals at leads 61, 62, and 63 at the desired nominal 11.8 volt leg-to-leg constant gradient.

For this purpose, the direct current outputs on leads 35 and 36 of gain control 34 are supplied to the conventional dual channel modulator 45, each of the two individual channels of which are supplied by lead 2a with the 400 Hz. reference signal output of generator 2. The direct current signals on leads 35 and 36 are modulated by the 400 Hz. alternating current signal in the conventional manner so that 400 Hz. signals appear on leads 46 and 47, proportional respectively to the sine and cosine of the magnetic heading of the craft. After individually separate supply to buffer amplifiers 52, 53, equally amplified versions of these signals appear on leads 54, 55 to which the feed back leads 56 and 57 are respectively connected.

Figure 2:
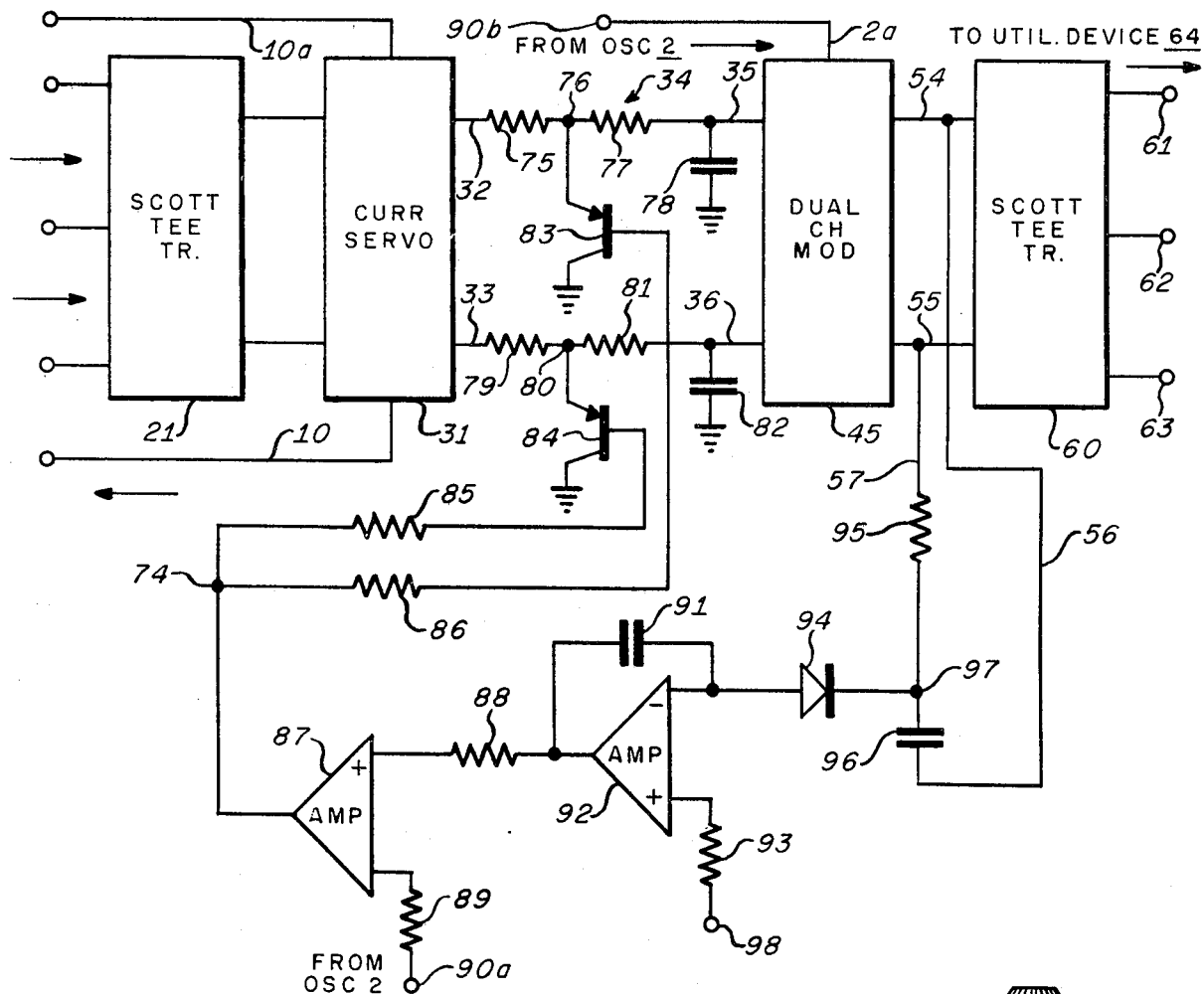
FIG. 2 is a portion of FIGS. 1A and 1B showing details of the novel automatic gain control circuit.

The automatic gain control 34, shown in greater detail in FIG. 2, monitors the gradient at the output leads 54, 55 of buffer amplifiers 52, 53, respectively, compares the result to a reference voltage level, then varies the system gain accordingly by control of the gain of automatic gain control circuit 34. If the gradient at the outputs of buffer amplifiers 52, 53 of FIG. 1A is less than a predetermined level, the voltage gain of circuit 34 is increased to bring the output of the buffer amplifiers 52, 53 up to the proper level. The output of the buffer amplifiers 52, 53 and the voltage gradient is similarly controlled. The signal levels at output leads 35, 36 of the automatic gain control 34 are ultimately passed through the output Scott tee transformer 60. The outputs of transformer 60 are therefore fully independent of any earth's magnetic field strength variation. Thus:

$$V_{35} = K_2 \sin \psi \quad (3)$$

and:

$$V_{36} = K_2 \cos \psi \quad (4)$$

where $K_2$ is a new proportionality constant.

Automatic gain control circuit 34 is designed to prevent the introduction of any stand-off or unbalance between transmission channels, resulting in cyclic errors, into the craft heading output data. The individual gains of the sine and cosine channels are now identically controlled and there are no off-set voltages induced into the direct current signals representing sine and cosine of craft magnetic heading. As is seen in more detail in FIG. 2, the direct current signals at leads 32 and 33 are, as before, provided by the cooperative action of flux valve 11, Scott tee transformer 21, and current servo 31, and are respectively proportional in amplitude to $\sin \psi$ and $\cos \psi$. Output lead 32 is coupled in series through resistor 75, junction 76, resistor 77 and input lead 35 to one channel of the dual modulator 45. At input lead 35 is a capacitor 78 coupled to ground and forming a low pass filter with resistor 77. Likewise, the second output lead 33 is coupled in series through resistor 79, junction 80, resistor 81, and input lead 36 to a second channel of dual modulator 45. At input lead 36 is a capacitor 82 forming a low pass filter with resistor 81. Switching or chopper transistors 83 and 84 are respectively coupled to ground from junctions 76 and 80 and control current flow through their emitter and collector electrodes in accordance with their respective base voltages.

The direct current signals on leads 32 and 33 are chopped by transistors 83 and 84, respectively and, after smoothing by low pass filters 77–78 and 81–82, form direct currents that are individually modulated in dual channel modulator 45 by the 400 Hz. reference signal on lead 2a. These dual channel output voltages are directed by Scott tee transformer 60 as three-wire synchro data to a navigation system or other utilization device 64.

For purposes of controlling the automatic gain control circuit 34, the same 400 Hz. modulated output currents on leads 54 and 55 are respectively coupled by leads 56 and 57 to a constant amplitude, variable phase circuit comprising resistor 95 and capacitor 96 coupled in series with leads 56, 57 at junction 97. Circuit 95–96 is of the general kind discussed in the D. A. Espen U.S. Pat. No. 3,548,284, entitled "Synchro Data Transmission Apparatus Having Discrete Gain Changing to Compensate for Undesirable Signal Gradient Variation", issued Dec. 15, 1970 and in the D. A. Espen U.S. Pat. No. 3,617,863, entitled "Constant Amplitude Variable Phase Circuit", issued Nov. 2, 1971, both patents being assigned to Sperry Rand. The constant amplitude, variable phase signal found at junction 97 is rectified by diode 94 and appears as a variable unipolar voltage at one input of a conventional integrating operational amplifier 92 having its output coupled by capacitor 91 to its same input. To the second input of amplifier 92 is coupled through resistor 93 a stable positive unidirectional reference voltage from a suitable source (not shown) connected to terminal 98. As shown in the drawing, amplifier 92 and its associated circuit act as conventional comparator means for in effect comparing the output gradient on leads 54, 55 with the fixed level voltage at terminal 98, yielding an integrated output as a function of the difference of the two voltage levels at leads 97 and 98.

The positive signal at the output of device 92 is coupled through resistor 88 to one input of amplifier 87, to the other input of which is supplied at terminal 90a and through resistor 89 the 400 Hz. excitation signal from generator 2. Under control of its varying amplitude direct current and constant amplitude alternating input currents, circuit 87 acts as a conventional variable pulse-width generator for supplying a 400 Hz. variable pulse-width signal at junction 74.

The variable pulse-width signal is coupled in parallel from junction 74 through the respective resistors 85, 86 to the base electrodes of chopper transistors 83 and 84 to control the relation of the conduction to non-conduction times of these switching transistors. The transistors 83, 84 are synchronously conducting at the same time and then are both non-conducting for a controlled period of time depending upon the pulse width of the output of amplifier 87. As the non-conducting part of the cycle is increased in time duration, the total current per cycle passing from lead 32 to lead 35, for example, is increased. In other words, proportionately less of the current available on lead 32 is dumped to ground. In this manner, the voltage between leads 54, 55 is made independent of any amplitude variations in the total flux valve data as well as amplitude variations resulting from other disturbing factors in the signal channels between current servo 31 and buffer amplifiers 52 and 53. Accordingly, the three-wire output supplied to utilization device 64 of FIG. 1 by transformer 60 is maintained nominally constant from leg to leg, such as at 11.8 volts.

Figure 3:
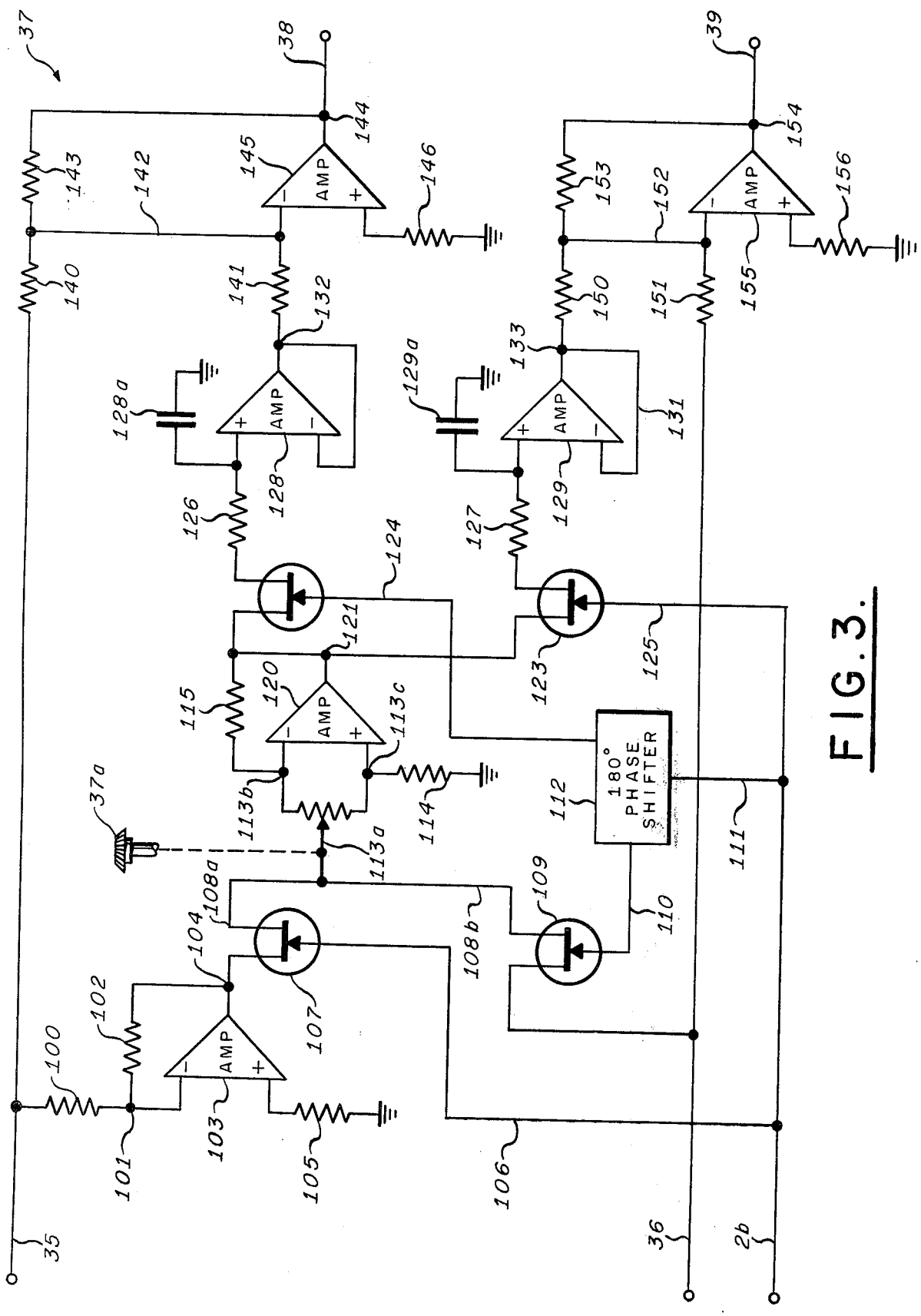
FIG. 3 is a detailed circuit diagram of the novel index error angle compensator of FIG. 1B.

In the complete system as illustrated in FIG. 1, the outputs $V_{35}$ and $V_{36}$ of the automatic gain control 34 on leads 35 and 36 may be first processed by the novel index error angle compensator 37 prior to 400 Hz. modulation. For this purpose, the compensation circuit of FIG. 3 is employed. The index error angle compensated by circuit 37 is present because of the normal difficulty of achieving perfect alignment between the aircraft fore-aft axis and the effective electrical fore-aft axis of the flux valve 11. Accordingly, index angle error compensator 37 is provided to permit a manual correction to be made after system installation by performing, in essence, the same function as might be provided by a relatively expensive servo differential which some prior art systems have employed. However, since installation accuracies are usually within ±10°, the compensation function may be accurately performed by the relatively inexpensive circuit of FIG. 3 wherein only a single potentiometer shaft need be adjusted. It will be apparent that the correction is made by the novel compensator herein disclosed to the value of angle $\psi$ when it is still in the trigonometric form of sin $\psi$ and cos $\psi$ data.

Accordingly, the apparatus of FIG. 3 accepts two inputs $K_2$ sin $\psi$ and $K_2$ cos $\psi$ and internally generates two values $- K_2\beta$ cos $\psi$ and $- K_2 \beta$ sin $\psi$. The $K_2$ sin $\psi$ value and the $- K_2 \beta$ cos $\psi$ value are added according to the well known trigonometric identity to form $K_2$ sin $(\psi + \beta)$ where $\psi' = \psi + \beta$ may be used to represent a corrected value of $\psi$. The $K_2$ cos $\psi$ value and the $-K_2\beta$ sin $\psi$ values are similarly added to form $K_2$ cos $(\psi+\beta)$. In accord with the teachings of the present invention, the $\beta$ terms must be identical in both the sine and cosine output channels to effect precise compensation; the same source for the $\beta$ term is used in the two channels of the circuit.

In greater detail, the circuit of FIG. 3 has, in operation, negative valued direct voltages representing $K_2$ sin $\psi$ and $K_2$ cos $\psi$ as respective inputs on leads 35, 36, and these are respectively supplied directly to inputs of conventional unity gain output amplifiers 145 and 155 at the right side of the figure. The same two direct negative voltages are used in the remaining or major part of the circuit to produce compensating voltages also for insertion into amplifiers 145, 155. For the latter purpose, the $-$sin $\psi$ term on lead 35 is coupled through a conventional inverting amplifier 103 to the switching transistor 107. Amplifier 103 has its output terminal 104 coupled through a resistor 102 to its input terminal 101 and additionally has a second input terminal coupled to ground through resistor 105. The $-$cos $\psi$ term on lead 36 is coupled directly to switching transistor 109. Transistors 107 and 109 are made alternately fully conducting and fully non-conducting so that, first, the output of amplifier 107 appears on lead 108a and then, the signal passed by switching transistor 109 appears on lead 108 b. Since both of the leads 108a and 108b are coupled to the adjustable contact 113a of potentiometer 113, it is seen that the signals alternately passed by switching transistors 107 and 109 are alternately applied to contact 113a for time-sharing purposes in the shared amplifier 120.

The switching transistors 107 and 109 are made alternately conducting under control of a sine wave signal appearing on lead 2b; this signal is conveniently obtained from the 400 Hz. generator 2 of FIG. 1A, though other regular stable-frequency signals may alternatively be employed. In practice, the 400 Hz. cycle signal on lead 2b is applied by lead 106 to control the conduction of transistor 107. So that time sharing may be employed, the signal on lead 2b is coupled via lead 111, the 180° phase shifter 112, and lead 110 to control the operation of switching transistor 109.

In this manner, the signals on leads 35 and 36 are alternately supplied at the selected contact point of potentiometer 113, the latter having its opposed terminals 113b and 113c coupled to inputs of operational amplifier 120. The output terminal 121 of amplifier 120 is coupled to its input at terminal 113b via resistor 115, and terminal 113c is connected through resistor 114 to ground in conventional fashion. The input of amplifier 120 is thus time shared and its output on terminal 121 is supplied to a second pair of switching transistors 122, 123, these transistors being arranged for controlling the series signal flow through the respective resistors 126, 127 to amplifiers 128, 129. The effective gain of amplifier 120 is changed according to the setting of the single control 37a, which control is manually set in accordance with the known magnitude of the index error determined as a result of conventional ground swinging operations.

Conductivity of switching transistor 122 occurs simultaneously with the conductivity of switching transistor 109. In like manner, conductivity of switching transistor 123 is made simultaneous with the periods of conductivity of switching transistor 107. This operation is accomplished by controlling the conductivity of switching transistor 123 according to the signal on lead 2b when supplied directly to switching transistor 123 via lead 125. The desired synchronous operation of switching transistor 122 is accomplished by providing the 180° phase shifted signal from circuit 112 via lead 124 to transistor 122. In this manner, both channels of the circuit time share the use of the common amplifier 120, ensuring that identical corrections are applied to the two channels; i.e., that the amount of the sine term added to the cosine term is identical to the amount of the cosine term subtracted in the sine channel. It is further observed that adjustment of the single control 37a allows adjustment of potentiometer 113 so that both channels are identically set in accord with the magnitude of the index error.

The time shared currents alternately flowing through switching transistors 122, 123 are alternately supplied to the conventional unity gain amplifiers 128, 129, and the respective outputs on the terminals 132, 133 flow through resistors 141, 150 to the same respective input terminals of amplifiers 145, 155, as are connected to the respective leads 35, 36. The outputs of amplifiers 145 and 155 may be smoothed by the action of appropriate low pass filters so as to remove any 400 Hz. modulation from the outputs appearing in the respective output leads 38, 39. In the embodiment illustrated, the filters are placed at the inputs of amplifiers 128 and 129 and comprise resistors 126, 127 and capacitors 128a, 129a, respectively.

The mathematical relation expressing the index error as a function of the sine and cosine of magnetic heading is:

$$\psi' = \tan^{-1} \frac{\sin \psi - \beta \cos \psi}{\cos \psi + \beta \sin \psi} \quad (5)$$

where:

$\psi'$ = the compensated output,
$\psi$ = the uncorrected input, and
$\beta$ = the tangent of the index error.

Thus, by adjusting the gain of the time shared amplifier 120 in accordance with the value of $\beta$, expression (5) is satisfied as follows. The output of amplifier 128 is:

$$V_{132} = -K_2 \beta \cos \psi \quad (6)$$

when transistors 109 and 122 are conducting, and the output of amplifier 129 is:

$$V_{133} = -K_2 \beta \sin \psi \quad (7)$$

when transistors 107 and 123 are conducting. The addition at amplifier 145 produces on output:

$$V_{38} = K_2 (\sin \psi - \beta \cos \psi) \quad (8)$$

while the addition at amplifier 155 produces an output:
$$V_{39} = K_2 (\cos \psi + \beta \sin \psi) \qquad (9)$$
or:
$$V_{38} = K_2 \sin \psi' \qquad (10)$$
and:
$$V_{39} = K_2 \cos \psi' \qquad (11)$$
These direct current signals are ready for conversion in dual channel modulator 45, providing as they do direct current signals in terms of $\psi'$ containing the desired index angle error compensation as set forth in equation (5). Thus, the dual channel modulator 45 supplies on its output leads 50, 51 400 Hz. signals whose amplitudes are:
$$V_{46} = K_3 \sin \psi' \qquad (12)$$
$$V_{47} = K_3 \cos \psi' \qquad (13)$$
and these signals serve as inputs to the two cycle error compensator 48.

Figure 4:
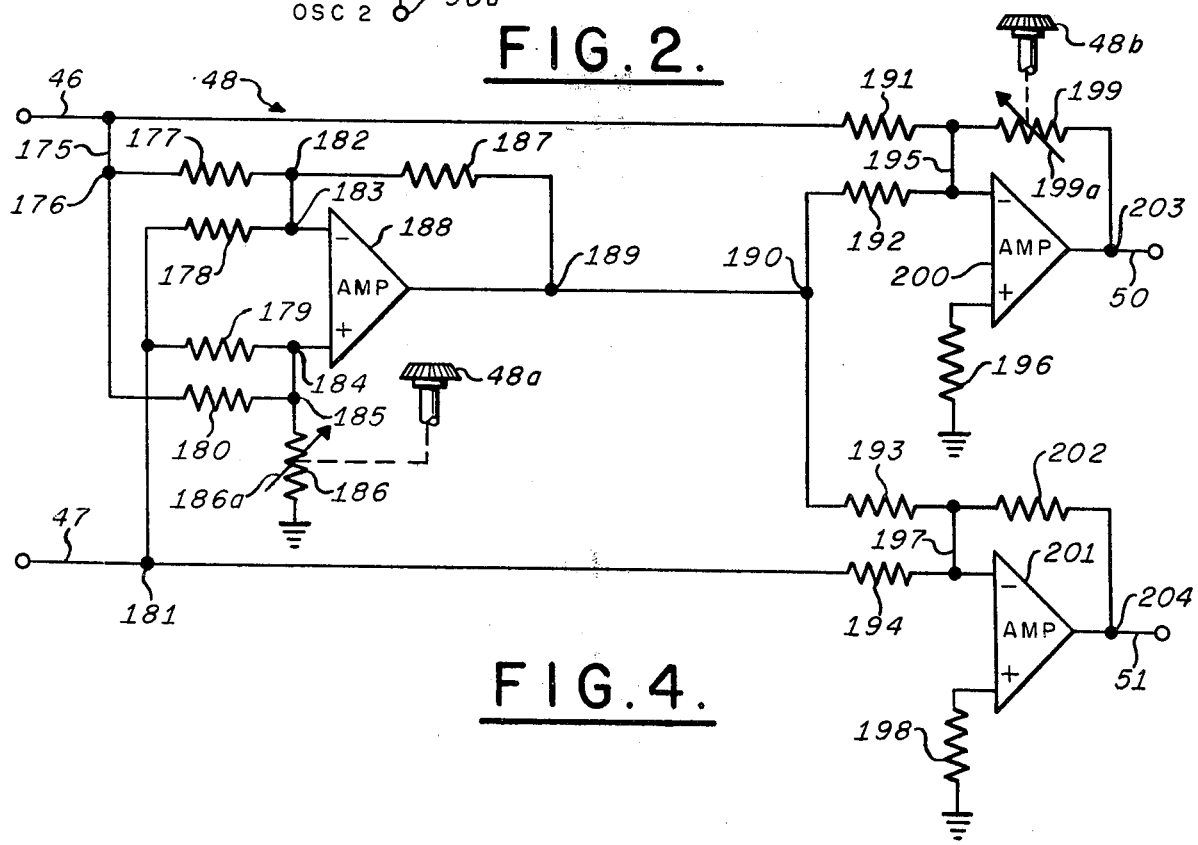
FIG. 4 is a detailed circuit diagram of the novel two cycle compensator also of FIG. 1B.

Two cycle error in a magnetic field sensor, including the flux valve type of sensor disclosed herein, is induced by the presence of a soft iron mass or masses in the vicinity of the flux valve which tends to distort the earth's ambient magnetic field thereat. As the name implies, the error is a sinusoidal error and has two complete cycles within 360° of azimuth rotation of the craft. In general, the average location of the soft iron mass relative to the flux valve determines the direction of its effective vector. For convenience, the two cycle compensation is accomplished by effectively breaking down the total vector into orthogonal components, one termed the cardinal two cycle error component and the other the intercardinal error component. The cardinal two cycle error has extremum values at heading angle values 0°, 90°, 180°, and 270°. Intercardinal two cycle error, on the other hand, has extremum values at 45°, 135°, 225°, and 315° azimuth values. In the invention of FIG. 4, the latter error is readily corrected by placing an adjustable series resistor 199 in the feed back path of a.c. amplifier 200 that is excited by lead 46. Adjustment of control 48b in accord with data taken during installation compass swings then corrects the output at lead 50 in the appropriate manner. The intercardinal two cycle heading error is compensated by changing the gain balance between the sine and cosine channels supplying outputs on the respective leads 50, 51.

Correction of the cardinal heading error is accomplished by the simple circuit of FIG. 4, using a single adjustment 48a and a common circuit stage in a manner minimizing error sources and characterized by simplicity. The amount of adjustment of control 48a is also determined by the installation ground swinging process. The $K_2 \sin \psi'$ signal on lead 46 is supplied via lead 175 through resistors 177 and 180 to the respective inputs of differential operational amplifier 188. The value $K_2 \cos \psi'$ from lead 47 is added through resistor 178 at terminal 183 to the $K_2 \sin \psi'$ term; similarly, the term $K_2 \sin \psi'$ from lead 46 is added through resistor 180 at terminal 185 to the $K_2 \cos \psi'$ term. Amplifier 188 has a resistor 187 coupled between its output 189 and the input terminal 183 in conventional fashion. A variable resistor 186 with an adjustable control 48a is coupled between terminal 185 and ground. The variable resistor 186 constitutes the single cardinal heading error adjustment, its variation affecting the effective gain $\gamma$ of amplifier 188. According to the setting of control 48a, a compensating voltage appears at the output 189 of amplifier 188:
$$V_{189} = -\gamma (\sin\psi' + \cos\psi') \qquad (14)$$
The signal value $V_{189}$ is coupled at junction 190 to branching leads for supplying this signal through resistors 192, 193 to the inputs of respective amplifiers 200 and 201. As noted previously, amplifier 200 has a variable resistor 199 coupled between its output 203 and its input lead 195. The other input to amplifier 200 is connected through resistor 196 to ground. A further amplifier 201 is supplied with the signal $K_2 \cos \psi'$ from lead 47 through resistor 194 and is similarly provided with a resistor 202 connecting its output 204 to its input lead 197. It similarly employs a resistor 198 coupled between a second input and ground. Amplifiers 200 and 201, through the respective connectors 195 and 197, serve as adding and inverting circuits so that the $K_2 \sin \psi'$ term on lead 46 has added to it the correction term appearing at terminal 190 and the summation is found on output lead 50. In a similar manner, the $K_2 \cos\psi'$ signal supplied on lead 47 is added to the compensating signal on junction 190 by amplifier 201 and its associated circuit, an inverted signal being generated on output lead 51. In this manner, the voltage $V_{50}$ is:
$$V_{50} = K_4 [\sin\psi' + \gamma(\sin\psi' + \cos\psi')] \qquad (15)$$
and that on output lead 51 is:
$$V_{51} = K_4 [\cos\psi' + \gamma(\sin\psi' + \cos\psi')] \qquad (16)$$
In equations (15) and (16), the new value $K_4$ may include the effect of the adjustment of resistor 199. Thus, the voltage on output lead 50 is $\sin\psi''$ and the voltage on output lead 51 is $\cos\psi''$, where $\psi''$ represents $\psi'$ corrected both for cardinal and intercardinal heading errors. From equations (15) and (16), it is evident that the value of the corrected angle $\psi''$ is expressed by the following equation:

$$\psi'' = \tan^{-1} \frac{(1+\gamma) \sin \psi' + \gamma \cos \psi'}{(1+\gamma) \cos \psi' + \gamma \sin \psi'} \qquad (17)$$

$\psi''$ being the final output heading value components corrected for cardinal and intercardinal two cycle errors. It is seen that amplifier 188, the effective gain $\gamma$ of which is controlled by the setting of the variable potentiometer 186, cooperates in the circuit in generating the function $\gamma (\sin\psi' + \cos\psi')$, and this function is added in the sine and cosine channels by the respective action of amplifiers 200 and 201 and their associated circuits. It is observed that correction of the cardinal heading two cycle error is accomplished by manual operation of a single adjustment. Furthermore, the single stage associated with amplifier 188 minimizes potential error sources and aids in simplifying the adjustment procedure.

Figure 5:
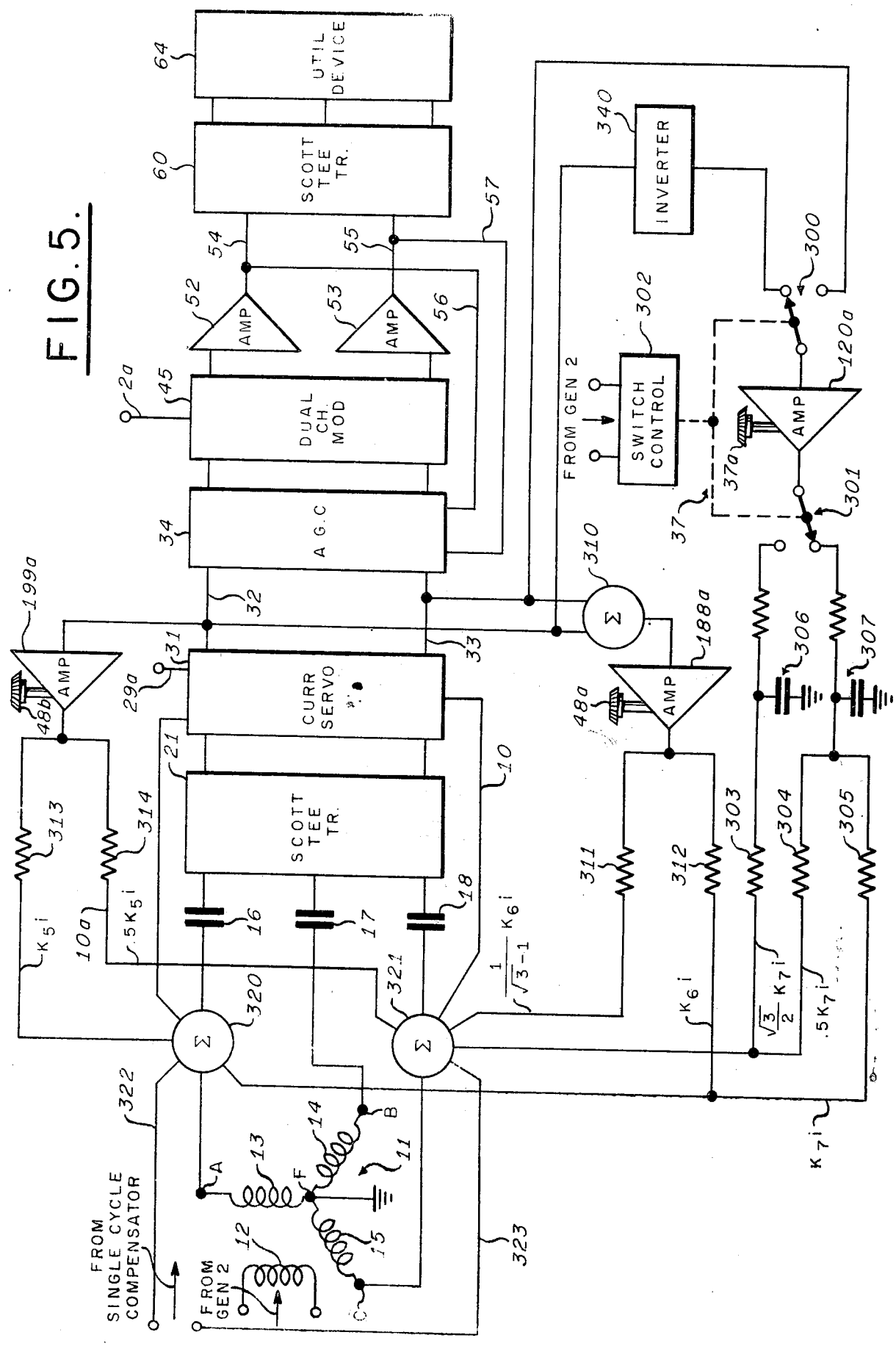
FIG. 5 is a block diagram of an embodiment of the invention alternative to that of FIGS. 1A and 1B.

It will be understood that the invention may be employed in alternative forms and that the compass system of FIGS. 1A and 1B may be modified within the scope of the claims appended hereto, for example, as illustrated in FIG. 5. In the embodiment of FIGS. 1A and 1B, the index compensation and two cycle error compensation signals are generated from the sine and cosine outputs of the current servo 31 and are reapplied downstream in the two channels to be summed with their original or uncompensated values. In the modification illustrated in FIG. 5, the sine and cosine outputs of the current servo 31 are used in essentially the same manner to generate the compensating signals as direct current signals; however, the summing of these signals with the original data is accomplished directly at the flux valve 11 by feeding back the compensating signals as direct currents into the flux valve legs themselves so as to, in effect, compensate the output of the flux valve itself broadly in accordance with the concept of the above referenced Depp U.S. Pat. No. 2,852,859.

Referring now to FIG. 5, similar reference numerals are used to designate elements corresponding to those found in FIGS. 1A through 4; elements not found in the latter figures are identified by reference numerals in the three hundreds. It will be seen that the embodiment of FIG. 5, like that of FIGS. 1A and 1B, employs in serial array a reference signal generator 2, a flux valve 11, blocking capacitors 16, 17, and 18, an input Scott tee transformer 21, a current servo 31, an automatic gain control 34, a dual channel modulator 45, power amplifiers 52 and 53, an output Scott tee transformer 60, and a utilization device 64. In a manner generally similar to that employed in FIG. 1A with respect to current servo leads 10 and 10a, the respective correction currents are fed to summation points 320, 321 of FIG. 5 so that they flow through the respective legs of flux valve 11 to ground, being blocked from flowing into the Scott tee transformer 21 by capacitors 16, 17, and 18.

In the lower portion of FIG. 5, the index compensation circuit 37 is schematically illustrated. The similarity with the corresponding structure of FIG. 3 will be immediately apparent and the simplification of the illustration correspondingly apparent. Thus, the $\sin\psi$ and $\cos\psi$ direct current signal outputs of the current servo 31 on leads 32, 33, respectively, are alternately applied after one is inverted by inverter 340 to the input of a variable gain amplifier 120a through switch means 300 corresponding to transistor switches 107, 109 of FIG. 3. The gain of amplifier 120a is illustrated schematically as being controlled by an adjustment knob 37a corresponding generally to the gain control of amplifier 120 of FIG. 3 by knob 37a and potentiometer 113 in accordance with the value $\beta$. The output of amplifier 120a is similarly alternately switched to two branch leads as in FIG. 3 by means of switch 301 corresponding generally to transistor switches 122, 123 of FIG. 3. The control of switches 300 and 301 of FIG. 5 is the same as that of FIG. 3, but is illustrated for convenience schematically in FIG. 5 by switch control means 302 controlled, for example, by the 400 Hz. source 2. In FIG. 3, the outputs of switches 122 and 123 are applied to two branching circuits including amplifiers 128 and 129 for modifying or summing with the original $\sin\psi$ and $\cos\psi$ direct current outputs of the current servo 31 through amplifiers 145 and 155. On the other hand, two output branches of switch 301 of FIG. 5 are applied correspondingly to control direct current flow for supplying compensating currents in the proper ratio to the 120° spaced inductor coils 13, 14, and 15 of flux valve 11 for effective summing with the original sources of the $\sin\psi$ and $\cos\psi$ signals of the current servo 31. In FIG. 5, these direct current ratios are determined by the selected resistors 303, 304, and 305, in the ratios indicated. The currents from resistors 304 and 305 are applied to flux valve winding 15, while that from resistor 303 is supplied to flux valve winding 13. If desired, the resistor-capacitor circuits 306 and 307 may be used to reduce transient effects of switches 300, 301.

Thus, as in FIG. 3, the apparatus of FIG. 5 serves to provide index error compensation through the time sharing of a single amplifier 120a between the $\sin\psi$ and $\cos\psi$ channels by alternate operation of the switches 300, 301, the gain of the amplifier 120a being controlled by a single control element 37a in accordance with the magnitude of the error. Such operation insures that the amount of $\sin\psi$ current supplied to the flux valve legs 13, 14, 15 and contributing to the $\cos\psi$ output channel of current servo 31 is identical to the amount of $\cos\psi$ current subtracted from the flux valve legs 13, 14, 15 and contributing to the $\sin\psi$ output channel of current servo 31.

A modification of the cardinal and intercardinal two cycle error compensator of the heading repeater system of FIG. 4 is shown in FIG. 5. Again, the significant feature of the embodiment resides in the manner in which the compensating signals are summed with the primary signals; i.e., at the flux valve 11 rather than at the output of the current servo 31. In FIG. 5, for the cardinal two-cycle error compensation, the $\sin\psi$ and $\cos\psi$ direct current outputs of current servo 31 on leads 32 and 33 are summed together in a summing circuit, schematically illustrated at 310, prior to supply to the input of variable gain amplifier 188a. The summing circuit 310 of FIG. 5 corresponds to the summing network 177–180 of FIG. 4, while the gain of the amplifier 188a is illustrated schematically as being varied by the adjustment of knob 48a in accordance with the magnitude $\gamma$ corresponding to the tangent of the desired correction. As in FIG. 4, the output of amplifier 188a is coupled through branching leads and the respective cooperating resistors 311 and 312 to summation circuits 320 and 321. Instead of being added back into the uncompensated $\sin\psi$ and $\cos\psi$ channels at amplifiers 200 and 201 in FIG. 4, the compensation currents are employed in the strengths indicated in the drawing of FIG. 5 so as to be fed directly into the winding legs 13 and 15 of flux valve 11. The currents are effectively summed with the flux valve winding outputs which contribute to the $\sin\psi$ and $\cos\psi$ signal outputs of the current servo 31.

The intercardinal two cycle error compensating signal is similarly applied to the flux valve windings. The direct current $\sin\psi$ signal output of current servo 31 is applied to variable gain amplifier 199a, the gain of which is varied by knob 48b in accordance with the magnitude of the required corrections, amplifier 199a of FIG. 5 corresponding to the variable impedance 199 and amplifier 200 of FIG. 4. The output of amplifier 199a is modified by resistors 313 and 314 in accord with the ratios indicated in FIG. 5 for application to the respective summation elements 320 and 321 and thus to the windings 13 and 15 of flux valve 11, so that the intercardinal two cycle correction signal is effectively summed with the flux valve winding outputs contributing to the outputs of the current servo 31.

Thus, in the modification of FIG. 5, the index and two cycle error compensation signals are generated from the $\sin\psi$ and $\cos\psi$ direct current outputs of the current servo 31 and are then fed back into the appropriate flux valve inductor windings in the required ratios so that the flux valve output supplied to the current servo 31 is compensated. It will be noted in the FIG. 5 embodiment that the feedback compensation signals are generated from the current servo outputs prior to the latitude compensation automatic gain stage 34. This is desirable because the compensating direct current signals supplied to the valve windings are essentially associated with the direction of the magnetic field sensed by the inductors and in this sense are not related to the latitude gain compensation.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. In a magnetic compass data transmission system for navigable craft having generator means responsive to the earth's magnetic field for generating first and second alternating output signals proportional to sin $\psi$ and cos $\psi$ representative of said earth's magnetic field direction $\psi$ with respect to said craft and substantially independent of the magnitude thereof, said generator means inherently producing two-cycle data transmission errors in the presence of an element distorting the earth's magnetic field in the vicinity of said generator means, the combination for correcting two cycle data transmission errors comprising:

amplifier circuit means having first and second input means, first summation means for coupling said signals proportional to sin $\psi$ and cos $\psi$ from said generator means to said first input means, second summation means for coupling said signals proportional to sin $\psi$ and cos $\psi$ from said generator means to said second input means, variable impedance means coupled in parallel relation with said second input means for controlling the magnitude of the effective gain $\gamma$ of said amplifier circuit means in proportion to said two cycle data transmission error thereby supplying at the output of said amplifier circuit means in cooperation with said first and second summation means a signal representative of $(-\gamma (\sin\psi + \cos \psi))$, and third and fourth summation means responsive to said amplifier circuit means output for producing respective corrected data transmission signals proportional to sin $\psi + \gamma$ (sin $\psi + \gamma$ cos $\psi$), and to cos $\psi + \gamma$ (sin $\psi$ + cos $\psi$).

2. Apparatus as described in claim 1 wherein said variable impedance comprises adjustable resistor means employed for correcting two cycle cardinal heading error in said data transmission system.

3. Apparatus as described in claim 2 additionally including variable resistor means coupling the output of said first summation means to its input adjustable for correcting two cycle intercardinal heading error in said data transmission system.

4. In a magnetic compass system for navigable craft including a magnetic compass of the flux valve type for sensing the direction of the earth's magnetic field relative to the craft, the combination for correcting for the magnitude and direction of any two-cycle error in said system due to the location of said compass relative to a magnetic field distorting member of said craft and determined during a ground swing of the craft, the combination comprising:

a magnetic field detector means including a plurality of inductor elements angularly disposed on said craft for providing a corresponding plurality of alternating signals proportional to the direction and magnitude of the correspondingly disposed horizontal components of the earth's magnetic field relative to the craft, signal processing means coupled with said inductor elements and responsive to said component alternating signals for providing first and second direct current signals proportional in sense and magnitude to predetermined functions of said earth's magnetic field direction, amplifier means having input means and output means, means for modifying said first and second signals in accordance with the output of said amplifier means, means supplying said first and second signals to said amplifier input means for providing in its output a signal in accordance with the sum thereof, adjustable means for controlling said amplifier gain in accordance with a function of said two-cycle error, and means for supplying said gain controlled amplifier output to said modifying means for correcting said first and second signals for said two-cycle error.

5. The combination as set forth in claim 4 wherein said first and second signals are proportional to the sine and cosine functions of said earth's magnetic field direction and include corresponding components of said two cycle error and said two-cycle error function is a tangent function.

6. The combination set forth in claim 5 wherein said means for modifying said first and second signals in accordance with the output of said amplifier means comprises:

a first summing circuit responsive to said first signal and said amplifier output signal, and a second summing circuit responsive to said second signal and said amplifier output signal.

7. The combination set forth in claim 5 wherein said means for modifying said first and second signals in accordance with said amplifier output means comprises:

circuit means responsive to said amplifier output means for providing a pair of direct current signals having predetermined ratios dependent upon the angular orientation of said magnetic field detector inductor elements, and means for applying said pair of d.c. signals to corresponding ones of said detector inductor elements whereby to vary said plurality of detector signals supplied to said signal processing means in accordance with said two-cycle error.

* * * * *